March 11, 1947.  V. JACOBSON  2,417,165
EXTRUSION APPARATUS AND METHOD
Filed April 18, 1944
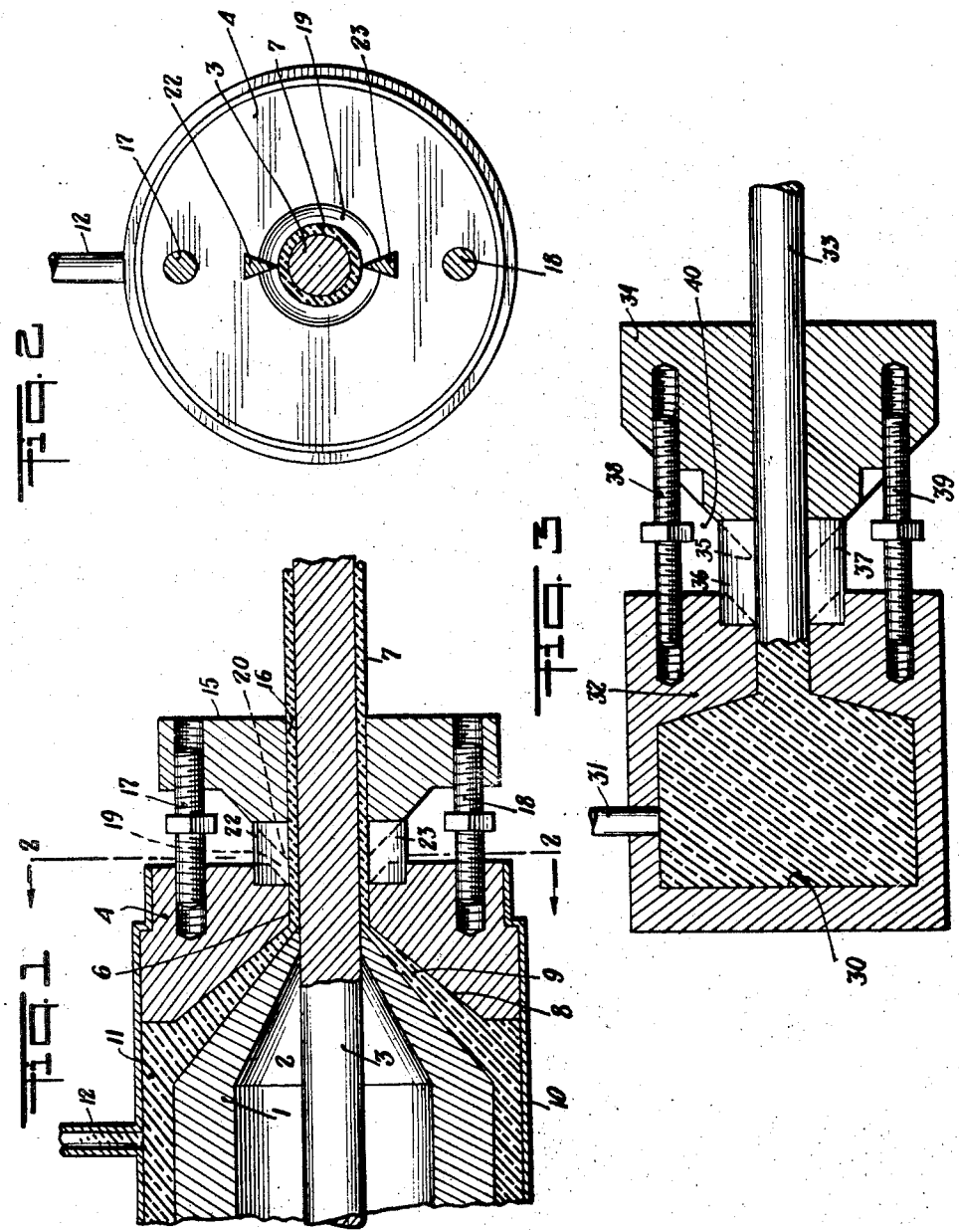
INVENTOR.
Victor Jacobson
BY
Pennie, Davis, Marvin & Edmonds
ATTORNEYS Patented Mar. 11, 1947

2,417,165

UNITED STATES PATENT OFFICE 2,417,165

EXTRUSION APPARATUS AND METHOD

Victor Jacobson, Hastings on Hudson, N. Y.

Application April 18, 1944, Serial No. 531,531

9 Claims. (Cl. 18—14)

This invention relates to the extrusion of plastic elongated articles and has for its object the provision of an improved method and apparatus for extruding various shaped articles of plastic materials through a forming die. More particularly, the invention contemplates the provision of an improved apparatus and method for extruding plastic sheaths on electrical conductors, bars, and the like with greater efficiency and more uniformity of product.

The invention is especially applicable to the so-called continuous extrusion operations such as are commonly used in the sheathing of conductors, and provides means for the interruption and the starting of the operation without appreciably impairing the continuity and uniformity of the extruded plastic material. For example, in the drawing of a wire through a die which forms a sheath over the wire, it is frequently necessary to interrupt the drawing of the wire. The plastic material, however, continues to flow, and when the operation is resumed, there is an imperfection manifested by ridges and other enlargements on the sheath that impairs the value of the product. The present invention overcomes this drawback and enables the operation to be interrupted and resumed without impairing the uniformity of the extruded product.

The apparatus of the invention comprises any suitable extrusion devices for extruding a thermoplastic, or like material, through a forming die, relief outlet means for receiving excess plastic material flowing through the die when the operation is interrupted, and a supplementary shaping member to remove any enlargements formed on the extruded product as a result of the interruption. The relief outlet for the plastic material is a space contiguous with the die opening at the outlet side of the die and the supplementary shaping member preferably surrounds the extruded product and shapes the product to the proper size immediately following resumption of the operation.

In an advantageous embodiment of the invention, the apparatus may be in the form of a two-part die, the first die performing the usual shaping operation and the second die being spaced from the first die and in the direction of travel of the extruded product. A space, preferably an annular space, is provided between the dies which serves as a relief outlet for the excess material which continues to flow from the first die when the operation is interrupted. The supplementary shaping member may, accordingly, be in the form of a die and may be provided with a shearing edge for removing the excess plastic material which flows into the relief outlet during interruptions. One or more knives may be mounted in the space between the two dies to slice the material forced through the relief outlet and thereby facilitate its removal.

These and other novel features of the invention will be better understood after considering the following discussion taken in conjunction with the accompanying drawings, in which:

Fig. 1 is a longitudinal sectional view of apparatus embodying the invention;

Fig. 2 is a view along the line 2—2 of Fig. 1, and

Fig. 3 is a longitudinal sectional view of another adaptation of the apparatus of the invention.

The apparatus illustrated in Figs. 1 and 2 comprises an annular sloping inner wall member 1, partly in the form of a truncated cone, having an opening 2 for centering and guiding the conductor or wire 3 drawn therethrough, and a die member 4 spaced from the wall member in the direction of travel of the wire and having the die opening 6 of such diameter that it will form a sheath 7 around the wire of the desired thickness. The die member preferably has a sloping wall 8 spaced from the wall member 1 to form a conically shaped passage 9 therebetween which is contiguous with the space between the die opening and the wire 3. The wall member 1 and die are provided with an exterior housing 10 which not only serves to secure the two elements together as a rigid structure but provides a chamber 11 contiguous with the conical space 9 for the plastic material.

The plastic material is supplied to the chamber 11 under pressure through the opening 12. The supplementary shaping member 15 is in the form of a die surrounding the sheathed conductor and has a die opening 16 of the same inside diameter as the exterior diameter of the sheath 7. (The die members 4 and 15 are referred to herein as the first and second die members respectively.) The die member 15 is mounted in rigid spaced relation with respect to the die member 4 in any suitable manner, as by means of the bolts 17 and 18. These bolts may be provided with left and right threads by means of which the annular space 19 between the die members 4 and 15 may be adjusted. In an advantageous embodiment of the invention, a knife edge 20 is provided on the die member 15 to shear off any excess of plastic material that may be on the exterior of the sheath, as will later be explained. In a preferred arrangement, two diametrically disposed and longitudinally extending knives 22 and 23 are mounted in the annular space 19 to split any material forced therethrough and thus facilitate its removal.

In carrying out a method of the invention in the apparatus illustrated, any suitable hot plastic material may be used to form the sheath that does not adhere to the die members, such as vinyl acetates and vinyl chloride, marketed under the trade name Vinylite, or the rubber-like composition sold under the trade name Koroseal. The plastic material at the proper temperature is forced under pressure into the chamber 11 from which it flows through the passage 9 and through the die opening 6 forming the sheath 7. In a normal continuous operation, the sheath 7 has a uniform exterior diameter and clears through the die opening 16 in the supplementary member 15 without requiring reshaping. Should it be necessary, however, to interrupt the drawing of the wire 3 for any reason, the plastic material which remains under pressure in the chamber 11 continues to flow through the die opening 6 and into the annular relief outlet 19. The material, in the form of a tube, is split into two halves by the knives 22 and 23 and may, accordingly, be removed in two parts. When the operation is resumed, the material in the outlet space 19, which is actually contiguous with the sheath portion, is sheared off to the proper exterior diameter by the knife edge 20 and the die opening 16 serves to smooth out the sheath to normal uniformity. There is, therefore, no noticeable difference in the exterior appearance of the sheath by reason of the interruption of the operation.

It is understood that the apparatus may be heated in any suitable manner as by means of a coil or jacket for the circulation therein of a heated fluid, such as steam or oil.

The apparatus illustrated in Fig. 3 comprises a chamber 30 which is supplied with plastic material under pressure through the pipe 31. The outlet of the chamber is in the form of a die 32 having any suitable cross sectional shape, for example, square, octagonal, or cylindrical, and the plastic material forced therethrough is in the form of a rod 33. The supplementary shaping member 34, also in the form of a die, surrounds the rod and has a knife edge 35 for shearing off excess material and a pair of knives 36 and 37 to slit the material. The bolts 38 and 39 support the member 34 in adjustable spaced relation with respect to the opening of the die 32. The annular relief outlet space 40 performs a function similar to that described in connection with the apparatus of Figs. 1 and 2. The apparatus is especially useful for thermoplastic materials, and, when such materials are used, the apparatus may be heated in any suitable manner when necessary. It is understood, of course, that the apparatus is not limited to the use of thermoplastic materials and may be used to form objects of any plastic material. The apparatus of Fig. 3 may be used, for example, in forming rods and the like of predetermined lengths. Each time a length is cut off there may be a momentary interruption, and the invention eliminates any irregularities which may result from such interruptions.

The apparatus of Fig. 3 may be used in connection with plastic molding apparatus, in which case the rod 33 may be extruded into any suitable mold and in which the plastic material may be given any desired shape. In this adaptation of the invention, the apparatus serves as a mold-filling means and the relief outlet space 40 as a pressure relief means preventing any excessive pressure being developed in the mold.

I claim:

1. The method of extruding a thermo-plastic material which comprises extruding the hot plastic material through a forming die to form a finished article, interrupting the movement of the finished article away from the forming die while excess material is forced through the die, passing excess material flowing through the die into a relief opening, resuming the movement of the finished article away from the die, removing irregularities from the extruded product resulting from the interruption by shearing off the excess material, and passing the extruded product through a supplementary forming operation.

2. Apparatus for the extrusion of material in a plastic state which comprises a chamber for containing the material to be extruded under pressure, a first die through which the material is forced to flow from the chamber, a second die, said second die having its inlet opening spaced from the outlet opening of the first die to provide a space between said dies which forms a relief outlet for material forced from the first die opening when an extruding operation is interrupted.

3. Apparatus for the extrusion of material in a plastic state as set forth in claim 2 in which at least one knife is located in the space between the two dies and so positioned as to split excess material forced into said space and facilitate its removal.

4. Apparatus for the extrusion of material in a plastic state as set forth in claim 2 in which a cutting edge is provided around the die opening in the second die to shear off excess material accumulating in the space between the two dies.

5. Apparatus for the extrusion of material in a plastic state as set forth in claim 2 in which a cutting edge is positioned around the die opening in the second die to shear off excess material accumulating in the space between the two dies and at least one knife is located in said space and so positioned as to split excess material forced into the space and facilitate its removal.

6. Apparatus for the extrusion of material in a plastic state which comprises a chamber for containing the material to be extruded under pressure, a first die member having a die opening through which the material is forced to flow from the chamber, a second die member having a die opening of substantially the same size and shape as the die opening in the first die member and substantially in alignment therewith, the inlet to the die opening in the second die member being spaced from the outlet of the die opening of the first die member to provide a space between said dies which forms a relief outlet for material forced from the first die member when an extruding operation is interrupted, said second die member serving to remove irregularities on the surface of material extruded through the first die member resulting from an interruption in the extruding operation causing enlargements where the excess material flows into said space.

7. Apparatus for the extrusion of a sheath of material in a plastic state around a wire or the like which comprises a chamber for containing the plastic material to be extruded under pressure, a first die member having a die opening through which the wire is passed, said chamber communicating with said die opening so that a wire passed through the die opening will have a sheath of the plastic material formed about it, a second die member having a die opening through which the sheathed wire leaving the first die member passes to remove any irregularities on the surface of the sheath resulting from an interruption of the extruding of the sheath, the inlet to the second die opening being spaced from the outlet of the first die opening to provide a space between said die members which forms a relief outlet for material forced from the first die opening when an extruding operation is interrupted.

8. Apparatus for the extrusion of a sheath of material in a plastic state around a wire or the like as set forth in claim 7 in which at least one knife is located in the space between the two dies and so positioned as to split excess material forced into said space and facilitate its removal.

9. Apparatus for the extrusion of a sheath of material in a plastic state around a wire or the like as set forth in claim 7 in which a knife edge is located in the space between the two dies and so positioned as to shear off excess material resulting from an extruding operation, and at least one knife is located in said space and so positioned as to split excess plastic material forced into such space to facilitate its removal.

VICTOR JACOBSON.

REFERENCES CITED

The following references are of record in the file of this patent:

UNITED STATES PATENTS

| Number | Name | Date |
|---|---|---|
| 2,233,928 | Weaver | Mar. 4, 1941 |
| 2,348,591 | Bailey | May 9, 1944 |
| 2,218,751 | Humphrey | Oct. 22, 1940 |

FOREIGN PATENTS

| Number | Country | Date |
|---|---|---|
| 430,890 | British | June 26, 1935 |